United States Patent
Wendt et al.

(10) Patent No.: US 9,864,945 B2
(45) Date of Patent: Jan. 9, 2018

(54) ELECTRICAL CONTROL UNIT AND RFID READ/WRITE DEVICE

(71) Applicant: Lenze Drives GmbH, Extertal (DE)

(72) Inventors: Hans Wendt, Hameln (DE); Kurt Raymann, Lenggenwil (CH)

(73) Assignee: Lenze Drives GmbH, Extertal (DE)

( * ) Notice: Subject to any disclaimer, the term of this patent is extended or adjusted under 35 U.S.C. 154(b) by 0 days.

(21) Appl. No.: 14/782,191

(22) PCT Filed: Apr. 3, 2014

(86) PCT No.: PCT/EP2014/056669
§ 371 (c)(1),
(2) Date: Oct. 2, 2015

(87) PCT Pub. No.: WO2014/161924
PCT Pub. Date: Oct. 9, 2014

(65) Prior Publication Data
US 2016/0042267 A1    Feb. 11, 2016

(30) Foreign Application Priority Data

Apr. 3, 2013    (DE) .................. 10 2013 205 896

(51) Int. Cl.
*G06K 19/07*    (2006.01)
*G06K 19/077*    (2006.01)
(Continued)

(52) U.S. Cl.
CPC ......... *G06K 19/0772* (2013.01); *G05B 19/42* (2013.01); *G06K 7/10316* (2013.01);
(Continued)

(58) Field of Classification Search
CPC .. G06F 9/44505; G06K 17/00; G06K 19/005; G06K 19/077; G06K 7/015; G06K 7/10316; G06K 7/10336
See application file for complete search history.

(56) References Cited

U.S. PATENT DOCUMENTS 6,779,091 B2    8/2004 Kari et al.
8,280,304 B2    10/2012 Hirsch
(Continued)

FOREIGN PATENT DOCUMENTS

DE    10 2007 029 423 A1    1/2009
DE    10 2007 036 835 A1    2/2009
(Continued)

OTHER PUBLICATIONS

International Search Report (PCT/ISA/210) issued in PCT Application No. PCT/EP2014/056669 dated Jul. 3, 2014 with English-language translation (four (4) pages).

*Primary Examiner* — Christopher Stanford
(74) *Attorney, Agent, or Firm* — Crowell & Moring LLP

(57) ABSTRACT

An electrical control unit which is supplied in operation with an operating voltage, has: a non-volatile memory for storing operating parameter values and/or program code of the control unit, a control device which is coupled to the memory and controls an operation of the control unit depending on the stored operating parameter values and/or the stored program code as long as the control unit is supplied with the operating voltage, and a passive radio-frequency identification transponder, which is coupled to the memory and, regardless of whether the control unit is or is not supplied with the operating voltage, is designed to store operating parameter values transferred from an RFID read/write device and/or program code transferred from the RFID read/write device in the memory and/or to transfer operating parameter values stored in the memory and/or program code stored in the memory to the RFID read/write device.

6 Claims, 3 Drawing Sheets

(51) Int. Cl.
*G08C 17/02* (2006.01)
*G05B 19/42* (2006.01)
*G06K 7/10* (2006.01)

(52) U.S. Cl.
CPC ....... *G06K 19/07758* (2013.01); *G08C 17/02* (2013.01); *G08C 2201/20* (2013.01)

(56) References Cited

U.S. PATENT DOCUMENTS

| | | |
|---|---|---|
| 2005/0037707 A1 | 2/2005 | Lewis |
| 2008/0041930 A1 | 2/2008 | Smith et al. |
| 2009/0002135 A1 | 1/2009 | Dold et al. |
| 2012/0168503 A1* | 7/2012 | Phillips ................ G06Q 20/352 235/439 |
| 2013/0233924 A1* | 9/2013 | Burns .................. G06K 7/0021 235/441 |

FOREIGN PATENT DOCUMENTS

| | | |
|---|---|---|
| DE | 10 2009 041 671 A1 | 3/2011 |
| DE | 20 2012 003 454 U1 | 7/2012 |
| EP | 1 248 239 A1 | 10/2002 |
| JP | 01190294 A * | 7/1989 |
| WO | WO 2009/044228 A2 | 4/2009 |

\* cited by examiner

ELECTRICAL CONTROL UNIT AND RFID READ/WRITE DEVICE

BACKGROUND AND SUMMARY OF THE INVENTION

The invention relates to an electrical control unit and an RFID read/write device.

Electrical control units, for example in the form of frequency inverters or servo inverters, normally have to be parameterized when they are commissioned, i.e. application-specific operating parameter values must be assigned to operating parameters and/or program code must be loaded into the control unit. Operating parameters may, for example, be a network address, a maximum deliverable output, switching characteristics, regulating parameters, etc.

The object of the invention is to provide an electrical control unit and an RFID read/write device which enable a simple and reliable setting of operating parameter values and/or the loading of program code, in particular without the need for the control unit to be opened, and which, in particular, enable a setting even if the control unit is not supplied with operating power and/or has a metal housing.

The invention achieves this object by means of an electrical control unit and an RFID read/write device according to embodiments of the invention.

In normal operation, the electrical control unit is supplied with an operating voltage, for example a mains voltage.

The electrical control unit has a non-volatile memory and/or program memory, for example an EEPROM or a flash memory, for storing operating parameter values and/or program code of the control unit.

A control device is furthermore provided, for example in the form of a microprocessor, which is coupled to the memory and controls an operation of the control unit depending on the stored operating parameter values and/or the stored program code as long as the control unit or its control device is supplied with the operating voltage.

The electrical control unit furthermore comprises a passive radio-frequency identification (RFID) transponder, which is similarly coupled to the memory and, regardless of whether the control unit is or is not supplied with the operating voltage, is designed to store operating parameter values transferred from an RFID read/write device and/or program code transferred from the RFID read/write device in the memory and/or to transfer operating parameter values stored in the memory or program code stored in the memory to the RFID read/write device. In particular, the passive radio-frequency identification (RFID) transponder is designed to store the operating parameter values transferred from the RFID read/write device and/or program code transferred from the RFID read/write device in the memory and/or to transfer operating parameter values stored in the memory or program code stored in the memory to the RFID read/write device if the control unit is not supplied with the operating voltage.

A passive RFID transponder is capable of generating its operating power entirely from the field generated by the RFID read/write device. Obviously, the RFID transponder can be supplied additionally from the operating voltage of the control unit.

The non-volatile memory is designed in such a way that access is possible from both the control device and the RFID transponder. The non-volatile memory may, for example, be a dual-port memory. Otherwise, reference is also made in this respect to the relevant technical literature.

The RFID transponder and the RFID read/write device may, for example, communicate with one another via Near Field Communication (NFC). Reference is also made in this respect to the relevant technical literature.

The electrical control unit may furthermore have a housing in which the memory, the control device and the RFID transponder are disposed.

The housing may have a plastic housing part. Along with the plastic housing part, a further metal housing part may be provided, wherein the two housing parts conjointly form a closed housing. Further housing parts may obviously be provided.

A symbol symbolizing to a user the position at which the read/write antenna is to be positioned may be provided on a side of the plastic housing part to be facing a user, i.e. on an outer side of the housing, as a positioning aid for a read/write antenna of the RFID read/write device. The symbol may, for example, symbolize an antenna.

A conventional transponder antenna can be assigned to the transponder or the transponder can be electrically connected to the transponder antenna, wherein the transponder antenna is disposed within the housing as immediately as possible below the symbol so that an operative coupling is provided between the read/write antenna of the RFID read/write device and the transponder antenna.

The housing may alternatively or additionally have an opening (parameterization opening) into which the read/write antenna of the RFID read/write device is insertable in such a way that a data transfer is possible between the RFID read/write device and the RFID transponder. The parameterization opening is provided so that the read/write antenna of the RFID read/write device is inserted into the parameterization opening.

The RFID transponder is supplied with power via the fields generated by the RFID read/write device so that the data and operating parameter values can be transferred and loaded into the memory without the electrical control unit having to be opened or connected to a supply voltage network to provide the operating voltage.

The housing may be a partially metal housing or an entirely metal housing so that an effective screening against interference emissions and interference immissions is provided, wherein a data communication is nevertheless possible between the RFID read/write device and the RFID transponder due to the parameterization opening.

The control unit may have a cover cap which is designed to seal the parameterization opening. The cover cap may be designed to be resealable, for example screwable, so that a multiple closing and opening is possible.

The cover cap may consist of a material that is essentially permeable to magnetic fields, electrical fields and/or electromagnetic fields. In particular, the cover cap is a plastic cover cap.

The cover cap may be designed to seal the parameterization opening in a fluid-tight manner.

The cover cap may have a sack-shaped depression into which the read/write antenna of the RFID read/write device is insertable so that the parameterization opening is, for example, sealed in a fluid-tight manner and a data communication between the RFID read/write device and the RFID transponder is simultaneously possible.

The read/write antenna of the RFID read/write device may be insertable into the parameterization opening of the housing and/or into the sack-shaped depression as far as a, for example mechanically predefined, final position.

The final position may be structurally defined in such a way that a distance between the read/write antenna of the RFID read/write device and a transponder antenna corresponds to a standard distance or lies within a standard distance range which is defined in a corresponding RFID transponder standard so that a standard-compliant power transfer and data transfer from the RFID read/write device to the RFID transponder is possible.

The final position may be predefined by means of shaping of the parameterization opening and/or shaping of the cover cap.

The parameterization opening of the housing may be a conical parameterization opening, wherein a diameter of the conical parameterization opening decreases in the direction of the inside of the housing.

The conical parameterization opening may be a cylindrical-conical parameterization opening.

The control unit may be a frequency inverter or servo inverter.

The RFID read/write device has a read/write antenna which is mechanically dimensioned in such a way that it is insertable into the parameterization opening of the aforementioned control unit, in particular as far as a final position.

The final position may be predefined by means of shaping of the read/write antenna and/or by means of a shoulder of the RFID read/write device following on from the read/write antenna.

BRIEF DESCRIPTION OF THE DRAWINGS

The invention is described in detail below with reference to the drawings, in which.

DETAILED DESCRIPTION OF THE DRAWINGS

Figure 1:
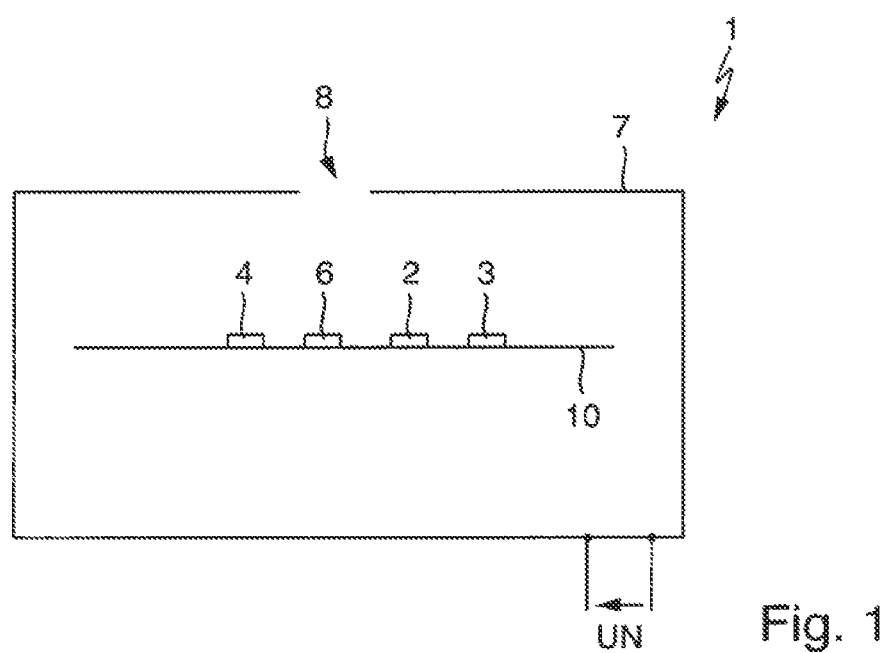
FIG. 1 shows schematically an electrical control unit in the form of a frequency inverter which is parameterizable by means of an RFID read/write device.
Figure 2:
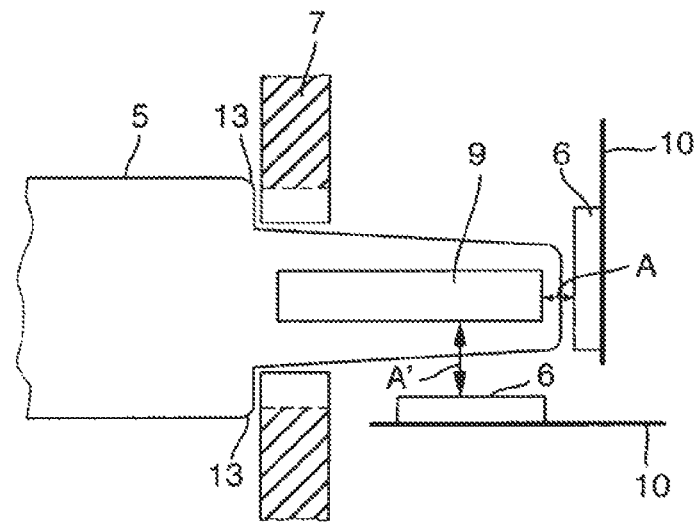
FIG. 2 shows schematically a section of the frequency inverter shown in FIG. 1, wherein the RFID read/write device is inserted into a parameterization opening of the frequency inverter as far as a final position.

FIG. 1 shows an electrical control unit in the form of a frequency inverter 1 which is parameterizable by means of a portable RFID read/write device 5 (see FIG. 2).

In the conventional operating case, the frequency inverter 1 is supplied with an operating or mains AC voltage UN.

The frequency inverter 1 has a non-volatile memory in the form of an EEPROM 2 which is disposed on a printed circuit board 10 for storing operating parameter values and/or program code.

A control device is furthermore provided in the form of a microprocessor 3 which is disposed on the printed circuit board 10 and is functionally coupled to the EEPROM 2. The microprocessor 3 controls the operation of the frequency inverter 1 depending on the stored operating parameter values and/or the stored program code as long as the frequency inverter 1 is supplied with the operating voltage UN. A suitable extra-low voltage can be generated from the operating voltage UN to supply the microprocessor 3.

The frequency inverter 1 furthermore has a conventional passive radio-frequency identification (RFID) transponder 4 and an associated transponder antenna 6, wherein the RFID transponder 4 and the transponder antenna 6 are disposed on the printed circuit board 10 and the RFID transponder 4 is functionally coupled to the EEPROM 2.

The RFID transponder 4 is provided in order to store operating parameter values transferred from the RFID read/write device 5 and/or program code transferred from the RFID read/write device 5 in the EEPROM 2 and/or to transfer operating parameter values and/or program code stored in the EEPROM 2 to the RFID read/write device 5, regardless of whether the frequency inverter 1 is or is not supplied with the operating voltage UN.

All of the aforementioned components are integrated into a metal housing 7, wherein the housing has a parameterization opening 8 which is designed and provided in such a way that a read/write antenna 9 (see FIG. 2) of the RFID read/write device 5 is insertable into the parameterization opening 8.

The parameterization opening 8 may be provided as a bore in the metal housing 7, wherein an internal thread may additionally be provided on the parameterization opening 8.

FIG. 2 shows a section of the frequency inverter 1 shown in FIG. 1, wherein the RFID read/write device 5 or its read/write antenna 9 is inserted into the parameterization opening 8 as far as a mechanically defined final position. The printed circuit board 10 is shown in two alternative positions.

The read/write antenna 9 is sheathed with a plastic housing in order to insulate the read/write antenna 9 electrically from the environment.

In both of the shown alternative positions of the printed circuit board 10, the final position is predefined structurally and mechanically in such a way that a distance A or A' between the read/write antenna 9 of the RFID read/write device 5 and the transponder antenna 6 lies within a standard distance range which is defined in a corresponding RFID transponder standard.

The read/write antenna 9 or its sheathing has a diameter which is smaller than a diameter of the parameterization opening 8. A shoulder 13 of the RFID read/write device 5 has a diameter which is greater than the diameter of the parameterization opening 8, so that the final position is mechanically defined by the position of the shoulder 13.

The final position can also be mechanically defined by establishing an interlocking connection between a boundary of the parameterization opening 8 and the read/write antenna 9 of the RFID read/write device 5.

The parameterization opening 8 may be designed as (cylindrically) conical, wherein a diameter of the conical parameterization opening 8 decreases in the direction of the inside of the housing.

For the parameterization process, the read/write antenna 9 is introduced or inserted into the parameterization opening 8. By means of the, for example conical, shaping, the read/write antenna 9 is positioned in a defined position/final position in relation to the transponder antenna 6. The shaping simultaneously prevents the read/write antenna 9 from penetrating too deeply, so that damage within the control unit 1 to be parameterized can be excluded.

The read/write antenna 9 may, for example, be constructed as electrically insulated by the sheathing, so that a protection of the operator is guaranteed even with a frequency inverter 1 switched on.

Figure 3:
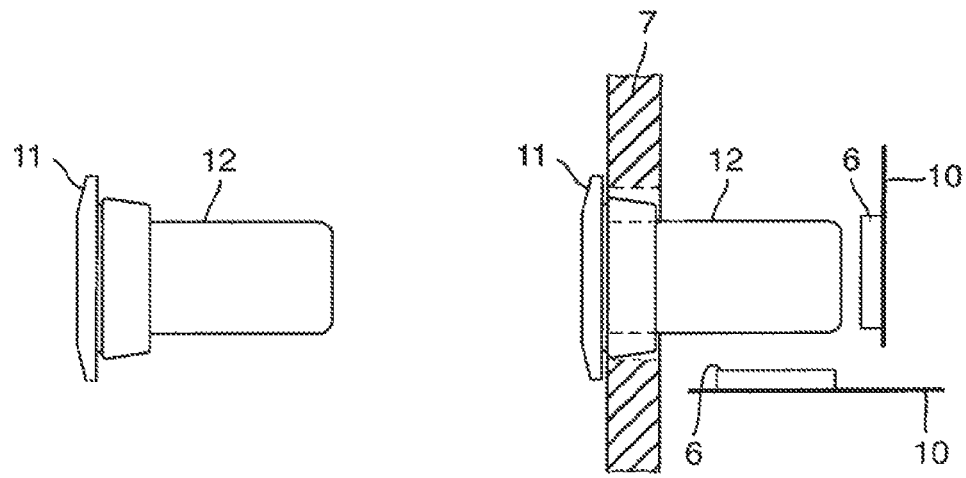
FIG. 3 shows schematically a cover cap with a sack-shaped depression for the insertion or screwing into the parameterization opening shown in FIGS. 1 and 2.

FIG. 3 shows a, for example screwable, plastic cover cap 11 with a sack-shaped depression 12 for the insertion or screwing into the parameterization opening 8 shown in FIGS. 1 and 2.

The read/write antenna 9 of the RFID read/write device 5 is insertable into the sack-shaped depression 12 in such a way that a data transfer between the RFID read/write device 5 and the RFID transponder 4 is possible. In this way, the parameterization opening 8 is sealable in a fluid-tight manner, wherein the cover cap 11 does not have to be removed for the parameterization.

The plastic cover cap 11 is shaped and disposed in such a way that it ends precisely above or next to the transponder antenna 6.

The read/write antenna 9 of the RFID read/write device 5 is adapted to the structural features of the control unit 1 to be parameterized by means of its shaping (for example conical tapering, length, diameter, etc.) in such a way that the power and data transfer to the control unit 1 to be parameterized is guaranteed even if the control unit 1 has a metal housing, as is frequently provided in the case of decentralized frequency inverters (e.g. motor inverters).

The control unit 1 to be parameterized has a parameterization opening 8 for this purpose, for example in the form of a bore, which may, if necessary, also be provided with a thread in order to attach a screwable cover cap.

The parameterization opening 8 is located at a position at which the antenna 6 of the transponder 4 is located on the printed circuit board 10.

This parameterization opening may be sealed during operation by means of a conventional cover cap for cable entries which has to be opened for the parameterization process.

Figure 4:
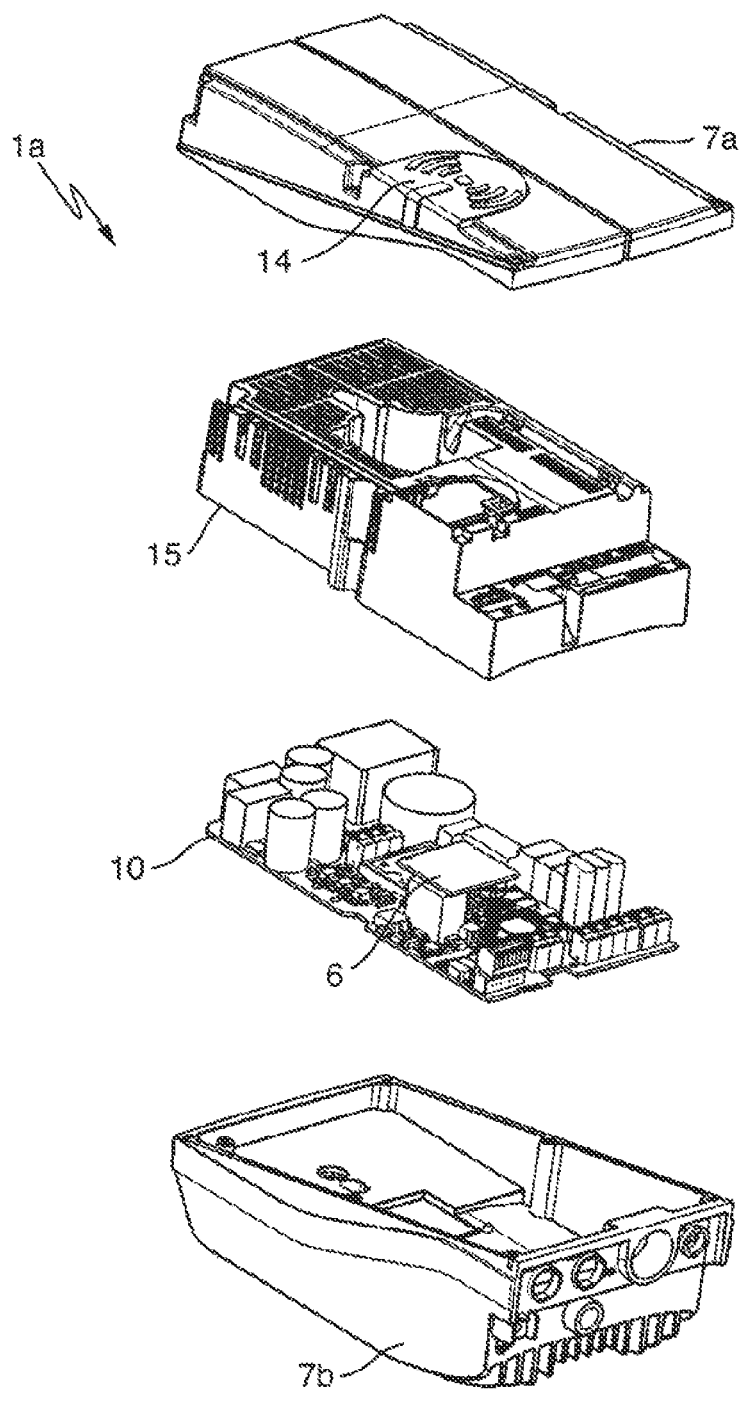
FIG. 4 shows schematically an electrical control unit in the form of a frequency inverter which is parameterizable by means of an RFID read/write device, according to a further embodiment.

FIG. 4 shows an exploded view of an electrical control unit in the form of a frequency inverter 1a which is parameterizable by means of the RFID read/write device 5, according to a further embodiment. Except for the absence of the parameterization opening and the design of the housing, this embodiment corresponds to the embodiments described above, so that reference is also made to the above description in order to avoid repetitions.

In the shown embodiment 1a, the housing is designed as a two-part housing and has no parameterization opening. The housing has a plastic housing upper part 7a and a metal, for example die-cast aluminum, housing lower part 7b, wherein the two housing parts 7a and 7b conjointly form a closed housing.

The printed circuit board 10 is held in a plastic molded part 15, wherein the composite structure consisting of the plastic molded part 15 and the printed circuit board 10 inserted therein is inserted into the housing lower part 7b and is connected to the latter by means of a screw connection. The housing upper part 7a serves as a cover and seals the arrangement in a fluid-tight manner.

A symbol or position marking 14 symbolizing to a user the position at which the read/write antenna 9 is to be placed is provided on a side of the housing upper part 7a to be facing a user, as a positioning aid for the read/write antenna 9 of the RFID read/write device 5. The read/write antenna 9 may be designed as flat in this case.

The flat transponder antenna 6 is held within the housing formed by the housing parts 7a and 7b immediately below the symbol 14 in the plastic molded part 15 and is electrically contacted with the printed circuit board 10 so that an operative coupling is provided between the read/write antenna 9 of the RFID read/write device 5 and the transponder antenna 6 if the read/write antenna 9 is correctly positioned.

According to the invention, the parameter values are transferred using RFID technology. An RFID transponder 4 is provided for this purpose in the control unit 1 to be parameterized. The RFID transponder 4 conventionally comprises a transponder antenna 6, a circuit for transmitting and receiving data and a non-volatile memory 2. This memory 2 is simultaneously functionally integrated into the circuit of the microprocessor controller 3 of the unit 1 to be parameterized.

The parameterization and data transfer are carried out by means of the portable RFID read/write device 5 by means of high-frequency radio waves and/or inductive or magnetic coupling, etc. The RFID transponder 4 is supplied with power via the radio waves or magnetic AC fields generated by the RFID read/write device 5 so that the data and operating parameter values and/or program code can be transferred and loaded into the memory 2 without the control unit 1 having to be opened by the operator or having to be connected to a supply voltage network.

The correct transfer of the data can be acknowledged via an indication to the operator, for example by means of the RFID read/write device 5, that the parameterization process or programming process is completed so that the operator can remove the RFID read/write device 5. The energy feed to the transponder 4 thereby ends, so that the latter switches itself off.

During operation, power is supplied to the operating parameter memory 2 by means of an extra-low voltage supply of the control unit 1 and the control device 3 of the control unit 1 can access the stored parameter values.

The invention enables the wireless parameterization of control units, for example frequency inverters and servo inverters, even if the latter (partially) have a metal housing without the control unit to be parameterized having to be opened and/or supplied with the operating voltage.

This is particularly advantageous in the context of commissioning and/or the development of new drive types.

The invention claimed is:
1. A system, comprising:
an RFID read/write device, and
an inverter which is supplied in operation with an operating voltage, the inverter comprising:
a non-volatile memory for storing operating parameter values and/or program code of the inverter,
an inverter control device which is coupled to the memory and controls an operation of the inverter depending on the stored operating parameter values and/or the stored program code as long as the inverter is supplied with the operating voltage,
a passive radio-frequency identification transponder, which is coupled to the memory and is designed to store operating parameter values transferred from the RFID read/write device and/or program code transferred from the RFID read/write device in the memory and/or to transfer operating parameter values stored in the memory and/or program code stored in the memory to the RFID read/write device,
a transponder antenna associated with the transponder,
a housing into which the memory, the inverter control device and the RFID transponder are integrated,
wherein
the housing comprises a plastic housing part, wherein a symbol is provided on a side of the plastic housing part to be facing a user as a positioning aid for a read/write antenna of the RFID read/write device,
the transponder antenna is disposed below the symbol on the plastic housing part, and
the RFID read/write device acknowledges a correct transfer of the operating parameter values and/or the program code.

2. The system as claimed in claim 1, wherein the housing has a parameterization opening which is designed such that the read/write antenna of the RFID read/write device is insertable into the parameterization opening.

3. The system as claimed in claim 2, further comprising a cover cap which is designed to seal the parameterization opening.

4. The system as claimed in claim 3, wherein the cover cap has a sack-shaped depression into which the read/write antenna of the RFID read/write device is insertable.

5. The system as claimed in claim 1, wherein the inverter is a frequency inverter or servo inverter.

6. The system as claimed in claim 4, wherein the cover cap sealing the parameterization opening defines a final insertion position of the RFID read/write device.

* * * * *